US005415720A

United States Patent [19]

Schönhammer et al.

[11] Patent Number: 5,415,720

[45] Date of Patent: May 16, 1995

[54] GLUING APPARATUS FOR A CORRUGATED BOARD INSTALLATION

[75] Inventors: Reiner Schönhammer, Amberg; Andreas Ziegler, Weiden, both of Germany

[73] Assignee: BHS Corrugated Maschinen- und Anlagenbau GmbH, Weiherhammer, Germany

[21] Appl. No.: 161,251

[22] Filed: Dec. 2, 1993

[30] Foreign Application Priority Data

Dec. 11, 1992 [DE] Germany ........................ 42 41 743.0

[51] Int. Cl.[6] .......................... B31F 1/28; B32B 31/08

[52] U.S. Cl. .................................... 156/357; 156/360; 156/378; 156/472; 156/578; 118/249; 118/258

[58] Field of Search ............... 156/472, 471, 470, 356, 156/357, 378, 360, 210, 205, 578; 427/207.1, 208, 428; 118/249, 258

[56] References Cited

U.S. PATENT DOCUMENTS

| | | | |
|---|---|---|---|
| 3,688,735 | 9/1972 | Brenner . | |
| 4,044,580 | 8/1977 | Worden et al. . | |
| 4,319,947 | 3/1982 | Tokuno | 156/472 X |
| 5,122,220 | 6/1992 | Seki | 156/470 |
| 5,275,656 | 1/1994 | Jendroska | 118/249 X |
| 5,348,612 | 9/1994 | Buetikofer et al. | 156/472 |

FOREIGN PATENT DOCUMENTS

| | | |
|---|---|---|
| 0362423 | 4/1990 | European Pat. Off. . |
| 62-198701 | 2/1987 | Japan . |
| 2095430 | 1/1982 | United Kingdom . |

*Primary Examiner*—Michael W. Ball
*Assistant Examiner*—Michele K. Yoder
*Attorney, Agent, or Firm*—Browdy and Neimark

[57] ABSTRACT

A gluing apparatus for a corrugated board installation is provided with a fluted roller and a gluing station. The actual size of the glue spreading gap formed between the fluted roller and the glue spreading roller of the gluing station is adjustable to a desired size via a control unit and an adjustment drive.

10 Claims, 2 Drawing Sheets

GLUING APPARATUS FOR A CORRUGATED BOARD INSTALLATION

BACKGROUND OF THE INVENTION

1. Field of the Invention

The invention relates to a gluing apparatus for a corrugated board installation with a fluted roller, rotating about a stationary axis in a bearing block, for a corrugated web of the corrugated board and with a gluing station associated with the fluted roller for gluing the corrugated web.

2. Background Art

A critical size when gluing the corrugated web is the distance of the fluted roller to a glue spreading roller of the gluing station, i.e. the size of the glue spreading gap formed between these two. This glue spreading gap must have a certain desired value according to the dimensioning of the fluting and in dependence on the used paper quality, so that an optimal gluing of the corrugated web takes place, which gluing in particular covers only the heads of the fluting.

In known gluing apparatuses the gluing station mounted in a frame is hydraulically driven to and pressed on fixed stops of the bearing block of the fluted roller. With the aid of a distance sensor the distance between the gluing station and the fluted roller and thus indirectly the actual size of the glue spreading gap is detected. This actual size is displayed in an operating unit of the gluing apparatus. If necessary, in case of an actual size of the glue spreading gap deviating from the desired size, this gap can be finely adjusted via a manual operating unit and an additional electrical driving unit.

A fine adjustment of this type, as a rule, takes place in a certain operating state of the gluing apparatus, i.e. for example with a warm machine. In the cold operating state this results in errors in the gap size caused by the difference in temperature and the changes in dimension of the rollers entailing therefrom. Furthermore, changes in the production speed, bearing clearances and mechanical deficiencies, such as for example allowances and wear, lead to a permanent change in the gap size between the glue spreading roller and the fluted roller. This results in production problems and quality losses in the manufacture of corrugated boards.

SUMMARY OF THE INVENTION

Accordingly, it is an object of the invention to embody a gluing apparatus for a corrugated board installation in such a manner that a uniform gluing of the corrugated web takes place with the aid of a defined glue spreading gap.

This object is attained by a gluing station comprising a frame, which is mounted radially displaceably relative to the fluted roller by means of a drive, a glue spreading roller rotatably mounted in the frame parallel to the rotational axis of the fluted roller, which glue spreading roller forms together with the fluted roller a glue spreading gap, a distance sensor arranged on the frame, which sensor detects a distance between the gluing station and the fluted roller and thus indirectly the actual size of the glue spreading gap, a stop arranged on the frame and adjustable by means of an adjustment drive, with which stop the gluing station is supported against the bearing block while being actuated upon by said drive, and a control unit coupled on its input side with the distance sensor and on its output side with the adjustment drive of the adjustable stop, by means of which control unit the stop is adjustable via its adjustment drive in such a manner that the actual size of the glue spreading gap can be adjusted to a desired size.

By the control unit the actual size of the glue spreading gap can be continuously detected and adjusted to a desired size via the distance sensor coupled with an input of the control unit. This is effected by the adjustment drive, coupled with an output of the control unit, for an adjustable stop, via which the frame of the gluing station is supported against the bearing block of the fluted roller. Via this adjustable stop, which is actuated by the control unit, the relative position of fluted roller bearing block and gluing station frame and thus the distance from fluted roller to glue spreading roller can be constantly changed in order to adjust the glue spreading gap to a certain desired size.

Further features, advantages and details of the invention will become apparent from the ensuing description of an example of embodiment taken in conjunction with the drawing.

DESCRIPTION OF THE PREFERRED EMBODIMENT

Figure 1:
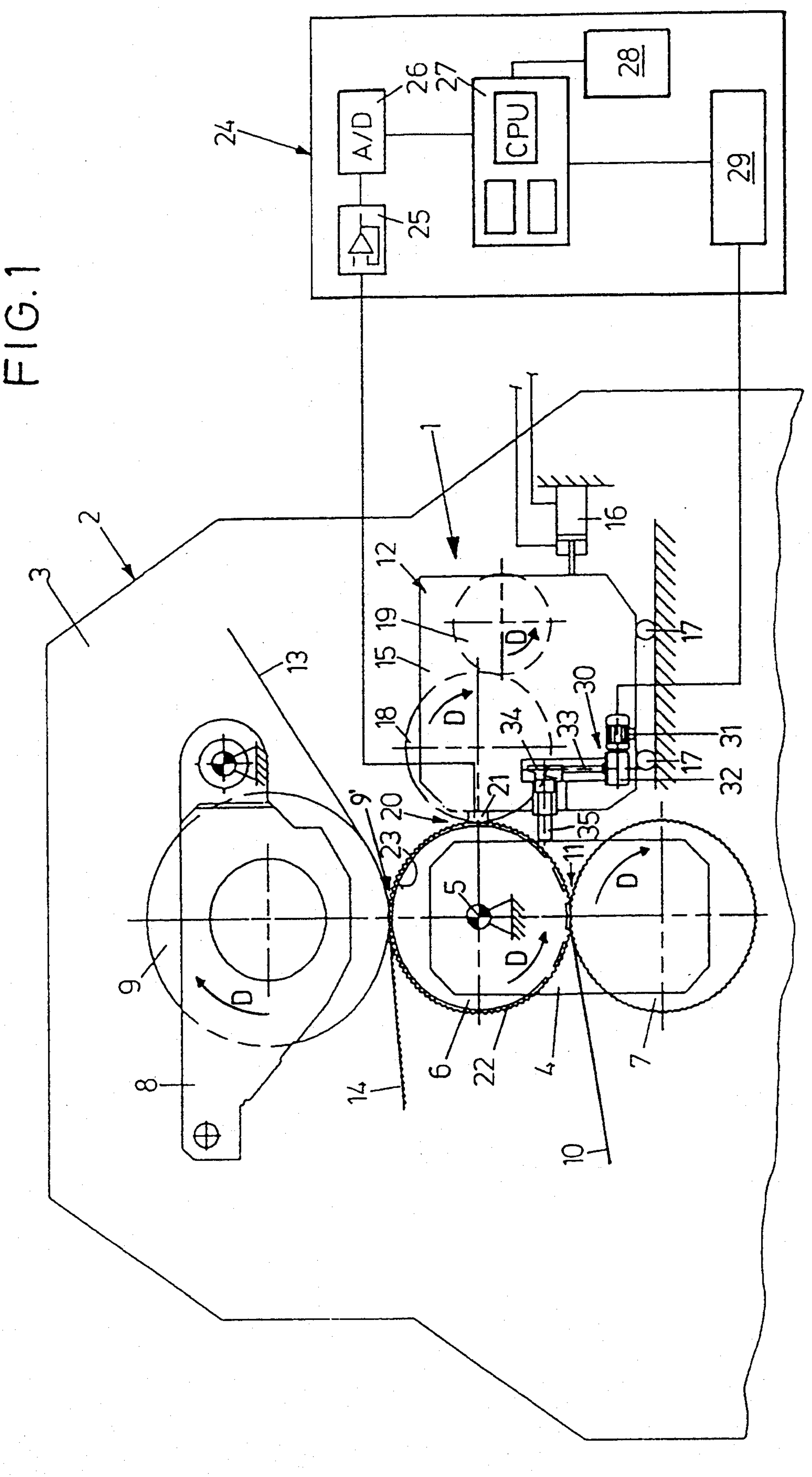
FIG. 1 shows a gluing apparatus for a corrugated board installation in a diagrammatical side view with a control unit illustrated as a block diagramm and FIG. 2 shows a diagrammatic plan view of the fluted roller and the glue spreading roller of the gluing apparatus.

In FIG. 1 the gluing apparatus 1 is illustrated as a part of a corrugating machine 2 for the production of one-sided corrugated board. The corrugating machine 2 comprises a machine frame 3 diagrammatically drawn in outlines, which via a bearing block 4 carries a pair of fluted rollers comprising the middle fluted roller 6 rotating on a stationary axis 5 in the manufacturing operation and the lower fluted roller 7 engaging with the fluted roller 6. The bearing block 4 with the pair of rollers 6, 7 is mounted in the machine frame 3 to be swung away if necessary, by means of which the shown pair of fluted rollers can be replaced by another pair of fluted rollers.

Above from the pair of fluted rollers 6, 7 a pressure roller 9 is rotatably mounted in the machine frame 3 via a pivotable lever 8, which pressure roller 9 can be fed in the radial direction towards the middle fluted roller 6.

The so-called corrugated web 10 of the one-sided corrugated board is guided through the fluting gap 11 formed between the two fluted rollers 6, 7, by means of which the corrugated web 10, which is smooth before entering the fluting gap 11, receives its fluting. The corrugated web 10 is subsequently guided around the middle fluted roller 6, where it is provided on the heads of its fluting with glue by a gluing station 12, cooperating with the fluted roller 6, of the gluing apparatus 1. Then the corrugated web 10 arrives in the pressure gap 9' formed between the pressure roller 9 and the fluted roller 6, into which gap 9' the so-called cover web 13 is fed and is connected with the corrugated web 10 under the force of the pressure roller 9 to form the one-sided corrugated board web 14 running out of the corrugating machine 2.

The gluing station 12 comprises a frame 15, which is mounted for radial displacement relative to the fluted roller 6 by means of a hydraulic piston cylinder drive 16 end supported on the machine frame 3. The displaceable mounting in FIG. 1 is outlined by the two rollers 17. In the frame 15 a glue spreading roller 18 is rotatably mounted parallel to the rotational axis 5 of the fluted roller 6. Furthermore, on the side, facing away from the fluted roller 6, of the glue spreading roller 18 an external nip roller 19 is rotatably mounted in the frame 15, with the aid of which nip roller 19 a glue layer is applied onto the glue spreading roller 18 from a glue reservoir not shown in detail in the gluing station 12.

The directions of rotation of the rollers (middle and lower fluted roller 6, 7, pressure roller 9, glue spreading roller 18 and nip roller 19) are outlined in FIG. 1 by corresponding arrows D.

Figure 2:
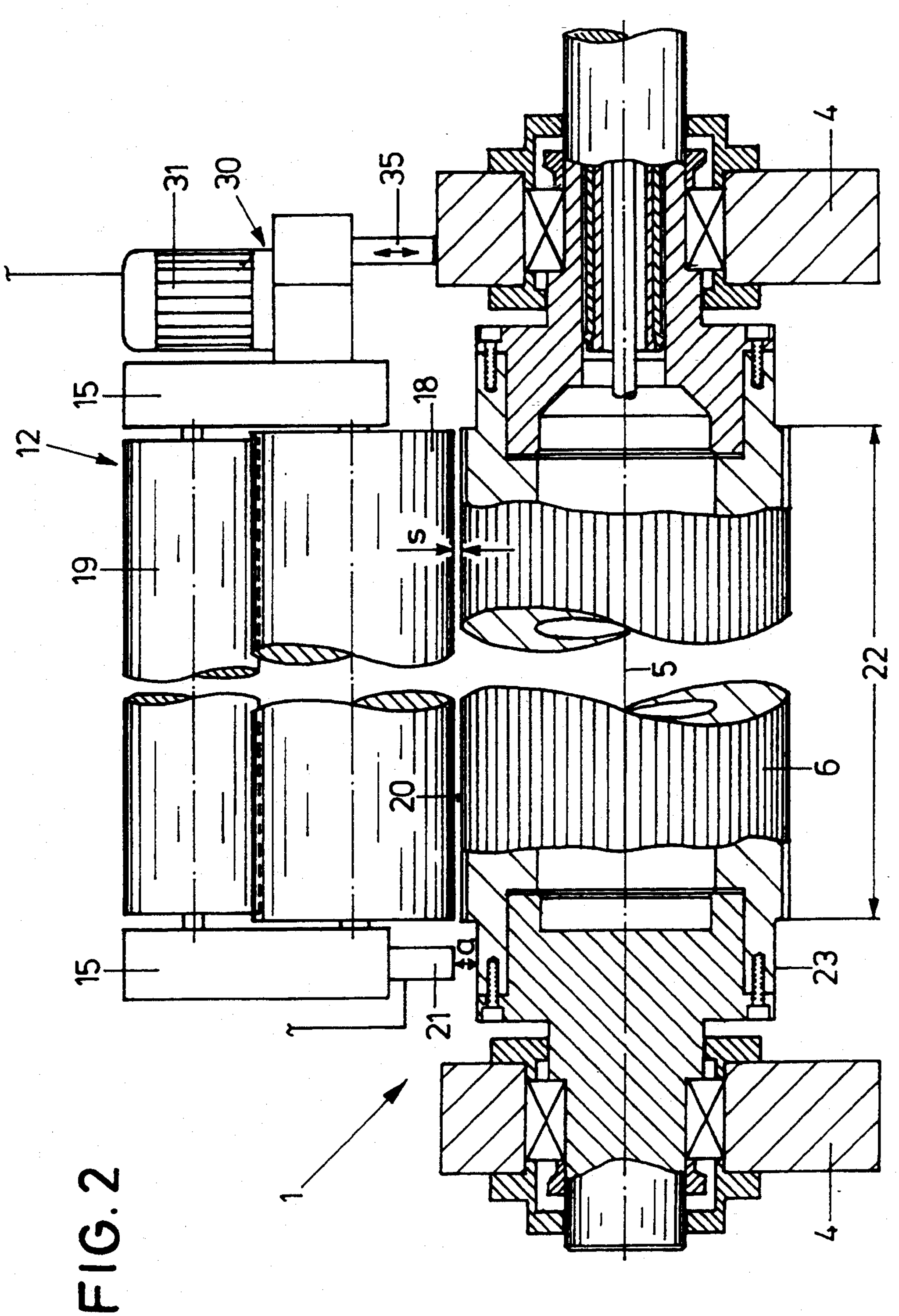

The glue spreading roller 18 and the fluted roller 6 form a glue spreading gap 20 between them, in which gap the glue on the glue spreading roller 18 is transferred to the corrugated web 10. The frame 15 being mounted radially displaceably in relation to the fluted roller 6, the radial gap size s of the glue spreading gap (FIG. 2) can be set by adjustment to a desired size in the manner described below.

For an indirect detection of the gap size s as actual size for its adjustment a distance senor in the form of an eddy current distance sensor 21 is arranged on the frame 15, which sensor 21 detects the distance a between the gluing station 12 and the fluted roller 6. For this purpose the eddy current distance sensor 21 is aligned with a smooth annular collar 23 arranged axially alongside of the fluted surface 22 of the fluted roller 6. The distance a detected by the eddy current distance sensor 21 is supplied in the form of a corresponding electrical measuring signal to the control unit marked as a whole with 24. This control unit 24 comprises a measuring amplifier 25 for the measuring signal as well as an A/D converter 26 downstream of the measuring amplifier 25 for digitizing the amplified measuring signal. Measuring amplifier 25 and A/D converter 26 thus form a measuring value processing unit of the control unit 24. The processed measuring signal is supplied to a central microprocessor unit 27, which with the aid of a corresponding program control converts in usual manner the distance a detected by the eddy current distance sensor 21 into a corresponding actual size of the gap size s and brings this distance a in relation to a desired size, which can be fed via an input unit 28, of the gap size s. With the aid of a corresponding control specification the microprocessor unit 27 produces a corresponding control signal in case the actual size of the gap size s deviates from the indicated desired size, which control signal is supplied via an output to a driver unit 29 for triggering an adjustment drive 30 for the frame 15.

This adjustment drive 30 comprises an electrical servomotor 31 triggered by the driver unit 29, which servomotor 31 is drivingly connected with an adjustable stop 35 via a deflection gearing 32, a spindle 33 and a wedge gearing 34. The gluing station 12 is supported with this stop 35 against the bearing block 4 while being actuated upon by the piston cylinder drive 16.

If, during the corrugated board production, a too low distance a between the eddy current distance sensor 21 and the annular collar 23 of the fluted roller 6 and thus a too low gap size s is determined by this sensor 21, the control unit 24 triggers the servormotor 31 in such a manner that the adjustable stop 35 is extended and thus the frame 15 of the gluing station 12 is pressed away from the fluted roller 6 counter to the actuation by the piston cylinder drive 16. This action is continued until the actual size of the gap size s corresponds to the fed desired size. The detection of the actual size of the gap size s being continuously effected, an optimum adjustment of the glue spreading gap is constantly provided.

What is claimed is:

1. A gluing apparatus for a corrugated board installation with a fluted roller (6), rotating about a stationary axis (5) in a bearing block (4), for a corrugated web (10) of the corrugated board and with a gluing station (12) comprising a frame (15), which is mounted radially displaceably relative to the fluted roller (6) by means of a drive (16), a glue spreading roller (18) rotatably mounted in the frame (15) parallel to the rotational axis (5) of the fluted roller (6), which glue spreading roller (18) forms together with the fluted roller (6) a glue spreading gap (20), a distance sensor (21) arranged on the frame (15), which sensor (21) detects a distance between the gluing station (12) and the fluted roller (6) and thus indirectly the actual size (s) of the glue spreading gap (20) by directly measuring against the perimeter of the fluted roller (6), a stop (35) arranged on the frame (15) and adjustable by means of an adjustment drive (30), with which stop (35) the gluing station (12) is supported against the bearing block (4) while being actuated upon by said drive (16), and a control unit (24) coupled on its input side with the distance sensor (21) and on its output side with the adjustment drive (30) of the adjustable stop (35), by means of which control unit (24) the stop (35) is adjustable via its adjustment drive (30) in such a manner that the actual size (s) of the glue spreading gap (20) can be adjusted to a desired size.

2. A gluing apparatus according to claim 1, wherein the distance sensor is an eddy current distance sensor (21).

3. A gluing apparatus for a corrugated board installation with a fluted roller (6), rotating about a stationary axis (5) in a bearing block (4), for a corrugated web (10) of the corrugated board and with a gluing station (12) comprising a frame (15), which is mounted radially displaceably relative to the fluted roller (6) by means of a drive (16), a glue spreading roller (18) rotatably mounted in the frame (15) parallel to the rotational axis (5) of the fluted roller (6), which glue spreading roller (18) forms together with the fluted roller (6) a glue spreading gap (20), an eddy current distance sensor (21) arranged on the frame (15), which eddy current distance sensor (21) detects a distance between the gluing station (12) and the fluted roller (6) and thus indirectly the actual size (s) of the glue spreading gap (20) by directly measuring against the perimeter of the fluted roller, a stop (35) arranged on the frame (15) and adjustable by means of an adjustment drive (30), with which stop (35) the gluing station (12) is supported against the bearing block (4) while said frame (15) being actuated upon by said drive (16), and a control unit (24) coupled on its input side with the eddy current distance sensor (21) and on its output side with the adjustment drive (30) of the adjustable stop (35), by means of which control unit (24) the stop (35) is adjustable via its adjustment drive (30) in such a manner that the actual size (s) of the glue spreading gap (20) can be adjusted to a desired size, wherein the flute roller (6) is provided axially alongside its fluted surface (22) with a smooth annular collar (23), with which the eddy current distance sensor (21) is aligned for distance detecting.

4. A gluing apparatus according to claim 1, wherein the control unit (24) comprises a measuring value processing unit (25, 26) coupled on its input side with the distance sensor (21), a central, program-controlled microprocessor unit (27), an input unit (28) for feeding the desired size of the glue spreading gap (20) and a driver unit (29) for triggering the adjustment drive (30) of the adjustable stop (35).

5. A gluing apparatus according to claim 1, wherein the adjustment drive (30) of the adjustable stop (35) comprises a servomotor (31) triggered by the control unit (24), which servomotor (31) is coupled with the adjustable stop (35) via a gearing (33, 34).

6. A gluing apparatus according to claim 3, wherein the control unit (24) comprises a measuring value processing unit (25, 26) coupled on its input side with the distance sensor (21), a central, program-controlled microprocessor unit (27), an input unit (28) for feeding the desired size of the glue spreading gap (20) and a driver unit (29) for triggering the adjustment drive (30) of the adjustable stop (35).

7. A gluing apparatus according to claim 3, wherein the adjustment drive (30) of the adjustable stop (35) comprises a servomotor (31) triggered by the control unit (24), which servomotor (31) is coupled with the adjustable stop (35) via a gearing (33, 34).

8. A gluing apparatus for a corrugated board installation with a fluted roller (6), rotating about a stationary axis (5) in a bearing block (4), for a corrugated web (10) of the corrugated board and with a gluing board (12) comprising a frame (15), which is mounted radially displaceably relative to the fluted roller (6) by means of a drive (16), a glue spreading roller (18) rotatably mounted in the frame (15) parallel to the rotational axis (5) of the fluted roller (6), which glue spreading roller (18) forms together with the fluted roller (6) a glue spreading gap (20), a distance sensor (21) arranged on the frame (15), which sensor (21) detects a distance between the gluing station (12) and the fluted roller (6) and thus indirectly the actual size (s) of the glue spreading gap (20), a stop (35) arranged on the frame (15) and adjustable by means of an adjustment drive (30), with which stop (35) the gluing station (12) is supported against the bearing block (4) while being actuated upon by said drive (16), and a control unit (24) coupled on its input side with the distance sensor (21) and on its output side with the adjustment drive (30) of the adjustable stop (35), by means of which control unit (24) the stop (35) is adjustable via its adjustment drive (30) in such a manner that the actual size (s) of the glue spreading gap (20) can be adjusted to a desired size, wherein axially alongside its fluted surface (22), the fluted roller (6) is provided with a smooth annular collar (23), against which the distance sensor (21) measures directly.

9. A gluing apparatus according to claim 8, wherein the control unit (24) comprises a measuring value processing unit (25, 26) coupled on its input side with the distance sensor (21), a central, program-controlled microprocessor unit (27), an input unit (28) for feeding the desired size of the glue spreading gap (20) and a driver unit (29) for triggering the adjustment drive (30) of the adjustable stop (35).

10. A gluing apparatus according to claim 8, wherein the adjustment drive (30) of the adjustable stop (35) comprises a servomotor (31) triggered by the control unit (24), which servomotor (31) is coupled with the adjustable stop (35) via a gearing (33, 34).

* * * * *